(12) United States Patent
Huang et al.

(10) Patent No.: US 12,051,820 B2
(45) Date of Patent: Jul. 30, 2024

(54) BATTERY PACK

(71) Applicant: Contemporary Amperex Technology Co., Limited, Ningde (CN)

(72) Inventors: Haihua Huang, Ningde (CN); Weigang Shi, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 457 days.

(21) Appl. No.: 17/418,779

(22) PCT Filed: Apr. 15, 2019

(86) PCT No.: PCT/CN2019/082662
§ 371 (c)(1),
(2) Date: Jun. 25, 2021

(87) PCT Pub. No.: WO2020/133807
PCT Pub. Date: Jul. 2, 2020

(65) Prior Publication Data
US 2022/0059897 A1    Feb. 24, 2022

(30) Foreign Application Priority Data

Dec. 27, 2018 (CN) .......................... 201811613811.3

(51) Int. Cl.
*H01M 50/289* (2021.01)
*H01M 50/103* (2021.01)
(Continued)

(52) U.S. Cl.
CPC ....... *H01M 50/289* (2021.01); *H01M 50/103* (2021.01); *H01M 50/147* (2021.01); *H01M 50/209* (2021.01)

(58) Field of Classification Search
CPC ............. H01M 50/289; H01M 50/209; H01M 50/103; H01M 50/147
See application file for complete search history.

(56) References Cited

U.S. PATENT DOCUMENTS

| 5,985,482 A | 11/1999 | Horton et al. |
| 2011/0143179 A1* | 6/2011 | Nakamori ........... H01M 50/271 |
| | | 429/99 |

(Continued)

FOREIGN PATENT DOCUMENTS

| CN | 104377322 A | * | 2/2015 | |
| CN | 104377322 A | * | 2/2015 | .......... H01M 50/147 |

(Continued)

OTHER PUBLICATIONS

The first office action relies on this translation of Chen (CN 104377322 A) which is included for clarity of the record. (Year: 2015).*

(Continued)

*Primary Examiner* — James A Shriver, II
*Assistant Examiner* — Nicholas R. Kandas
(74) *Attorney, Agent, or Firm* — Kilpatrick Townsend & Stockton LLP

(57) ABSTRACT

A battery pack, including: a plurality of battery cells, where each of the plurality of battery cells includes a top cover and a case, the top cover is hermetically connected on a top of the case, the case includes opposite first surfaces and opposite second surfaces, and an area of each first surface is larger than that of each second surface; and a lower housing, including a bottom plate disposed at a bottom, side plates disposed at sides, and an opening is disposed at an upper part, each of a pair of opposite side plates of the lower box is disposed with a reinforcing beam. At least one first surface of the plurality of battery cells is in contact with a side plate of the lower housing or the reinforcing beam.

13 Claims, 5 Drawing Sheets

(51) Int. Cl.
    *H01M 50/147* (2021.01)
    *H01M 50/209* (2021.01)

(56) References Cited

U.S. PATENT DOCUMENTS

| | | | |
|---|---|---|---|
| 2012/0141854 A1 | 6/2012 | Lee | |
| 2014/0315070 A1* | 10/2014 | Park | H01M 50/209 429/151 |
| 2020/0099027 A1* | 3/2020 | Ishibashi | H01M 10/46 |

FOREIGN PATENT DOCUMENTS

| | | |
|---|---|---|
| CN | 204289559 U | 4/2015 |
| CN | 106450089 A | 2/2017 |
| CN | 206432307 U | 8/2017 |
| CN | 107845754 A | 3/2018 |
| CN | 207381450 U | 5/2018 |
| CN | 207664095 U | 7/2018 |
| CN | 207818634 U | 9/2018 |
| JP | 2010153130 A | 7/2010 |
| JP | 2018195378 A | 12/2018 |
| WO | 2018029168 A1 | 2/2018 |
| WO | WO-2018166895 A1 * | 9/2018 |

OTHER PUBLICATIONS

The second office action relies on this translation of Quandt (WO 2018166895 A1) which is included for clarity of the record. (Year: 2018).*
Contemporary Amperex Technology Co., Limited, Extended European Search Report, EP 19901900.1, Jan. 4, 2022, 22 pgs.
Contemporary Amperex Technology Co., Limited, PCT International Search Report and English Translation, PCT/CN2019/082662, Sep. 27, 2019, 6 pgs.
Contemporary Amperex Technology Co., Limited, PCT ISA Written Opinion, PCT/CN2019/082662, Sep. 27, 2019, 4 pgs.
Contemporary Amperex Technology Co., Limited, CN First Office Action, CN201811613811.3, Jan. 20, 2020, 8 pgs.
Contemporary Amperex Technology Co., Limited, CN Second Office Action, CN201811613811.3, Jun. 1, 2020, 8 pgs.
Contemporary Amperex Technology Co., Limited, CN Final Office Action, CN201811613811.3, May 6, 2021, 4 pgs.

* cited by examiner

BATTERY PACK

CROSS-REFERENCE TO RELATED APPLICATIONS

The present application is a United States National Stage Application filed under 35 U.S.C. § 371 of PCT Patent Application Serial No. PCT/CN 2019/082662, filed Apr. 15, 2019, which claims priority to Chinese Patent Application No. 201811613811.3, filed on Dec. 27, 2018 and entitled "BATTERY PACK," each of which is incorporated herein by reference in its entirety.

TECHNICAL FIELD

The present invention relates to the technical field of energy storage devices, and in particular, to a battery pack.

BACKGROUND

Generally, a battery module is formed by connecting several battery cells in series and parallel, and each battery module is mounted in a battery pack. The battery module generally includes two end plates. The end plates of the battery module serve to resist an expansion force of the battery cell. Generally, a lower housing of the battery pack is formed by punching sheet metal or butt-welding extruded aluminum profiles. The battery pack is relative heavy because of a heavy case of the battery pack per se together with several battery modules mounted in the battery pack. To reduce the overall weight of the battery pack, the lower housing is usually made of lightweight materials such as carbon fiber. However, the lightweight housing is high in cost and low in production efficiency.

SUMMARY

Therefore, it is desired to provide a battery pack to solve the problem that the existing battery pack has heavy structure.

To achieve the foregoing objective, a battery pack is provided, including: a plurality of battery cells, wherein each of the plurality of battery cells includes a top cover and a case, the top cover is hermetically connected on a top of the case, the case includes opposite first surfaces and opposite second surfaces, and an area of each first surface is larger than that of each second surface; and a lower housing, including a bottom plate disposed at a bottom, side plates disposed at sides, an opening disposed at an upper part; each of a pair of opposite side plates of the lower box is disposed with a reinforcing beam; and at least one first surface of the plurality of battery cells is in contact with a side plate of the lower housing or the reinforcing beam.

Further, the reinforcing beam includes a first reinforcing beam, the first reinforcing beam is disposed inside the lower housing, and at least one first surface of the plurality of battery cells is in contact with the first reinforcing beam.

Further, a height of the first reinforcing beam is less than a height of the side plate of the lower housing, and the first reinforcing beam and the side plate of the lower box are formed in a stepped shape.

Further, the first reinforcing beam and the side plate of the lower housing are integrally formed.

Further, the reinforcing beam includes a second reinforcing beam, the second reinforcing beam is disposed outside the lower housing, and at least one first surface of the plurality of battery cells is in contact with the side plate of the lower housing.

Further, the second reinforcing beam and the side plate of the lower housing are integrally formed.

Further, the reinforcing beam includes the second reinforcing beam, and the second reinforcing beam is disposed outside the lower housing.

Further, a height of the first reinforcing beam is less than a height of the side plate of the lower housing, the first reinforcing beam and the side plate of the lower box are formed into a stepped structure, and a side of the second reinforcing beam facing the lower housing, is a structure that matches with the stepped structure.

Further, an adhesive layer is disposed on an upper surface of the second reinforcing beam, the upper surface facing the stepped structure of the lower housing.

Further, an adhesive overflow slot is disposed on the upper surface of the second reinforcing beam, the upper surface facing the stepped structure of the lower housing.

Further, the first reinforcing beam and the side plate of the lower housing are integrally formed.

Further, the second reinforcing beam and the side plate of the lower housing are integrally formed.

Further, the battery box includes at least one cross beam, wherein the at least one cross beam is perpendicular to the reinforcing beam, and the at least one cross beam is fixedly connected to the side plates of the lower housing or the reinforcing beam at both ends of the at least one cross beam, and the at least one cross beam divides an internal space of the lower housing into at least two battery regions.

Further, the at least one cross beam is connected to the side plate of the lower housing or the reinforcing beam at each end of the at least one cross beam by a connecting member.

Further, the battery box includes at least one longitudinal beam, wherein the at least one longitudinal beam is perpendicular to the at least one cross beam, a notch structure is provided at the at least one longitudinal beam or the at least one cross beam, the at least one longitudinal beam is connected to the at least one cross beam by the notch structure, and the at least one cross beam and the at least one longitudinal beam jointly divide the inner space of the lower housing into at least two battery regions.

Further, the reinforcing beam further includes a third reinforcing beam, the third reinforcing beam is disposed inside the lower housing and located on the at least one cross beam, the third reinforcing beam is perpendicular to the at least one cross beam, a bulge is disposed at each of two ends of the at least one cross beam, a groove is provided at a position on the third reinforcing beam, the position corresponding to the bulge of the at least one cross beam, and the bulge at each end of the cross beam is snap-fitted into the groove of the third reinforcing beam.

In contrast to existing technologies, the technical solutions disclosed above have the following advantages: the reinforcing beams are disposed at opposite side plates of the lower housing, thereby effectively increasing strength of the side plates of the lower housing. Further, the battery cells are arranged in the lower housing in rows, thereby a heavy structure of end plates of the battery module is avoided, overall production cost of the battery pack is reduced, and the battery pack is lightweight availably.

REFERENCE NUMERALS

Figure 1:
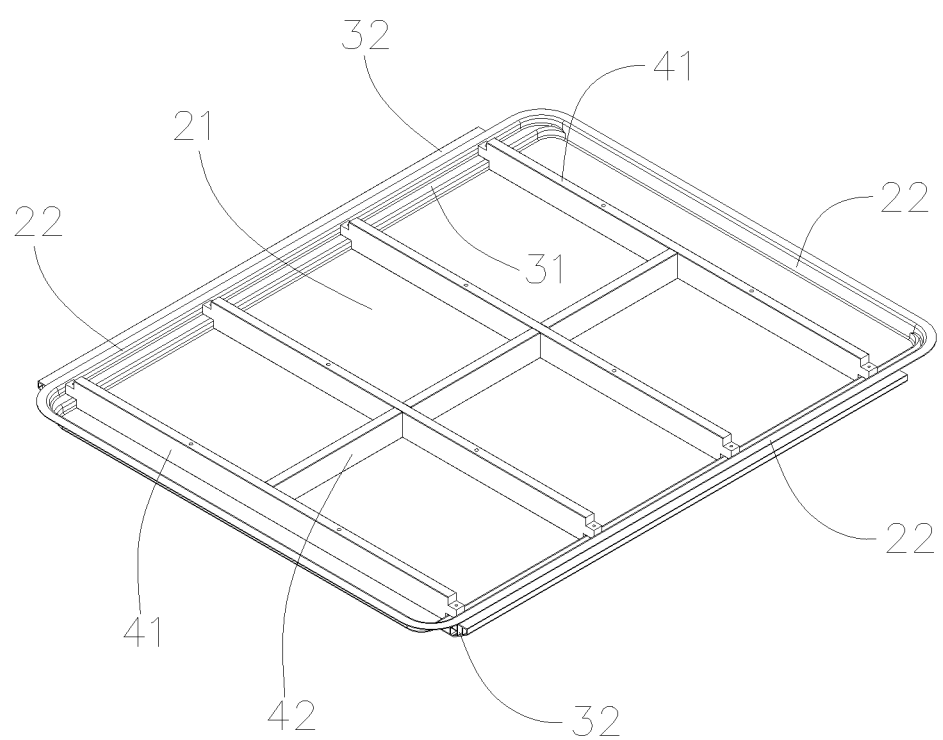
FIG. 1 is a schematic structural diagram of a lower housing of a battery pack having a first reinforcing beam(s), a second reinforcing beam(s), a cross beam(s), and a longitudinal beam(s) according to an embodiment of this application.
Figure 2:
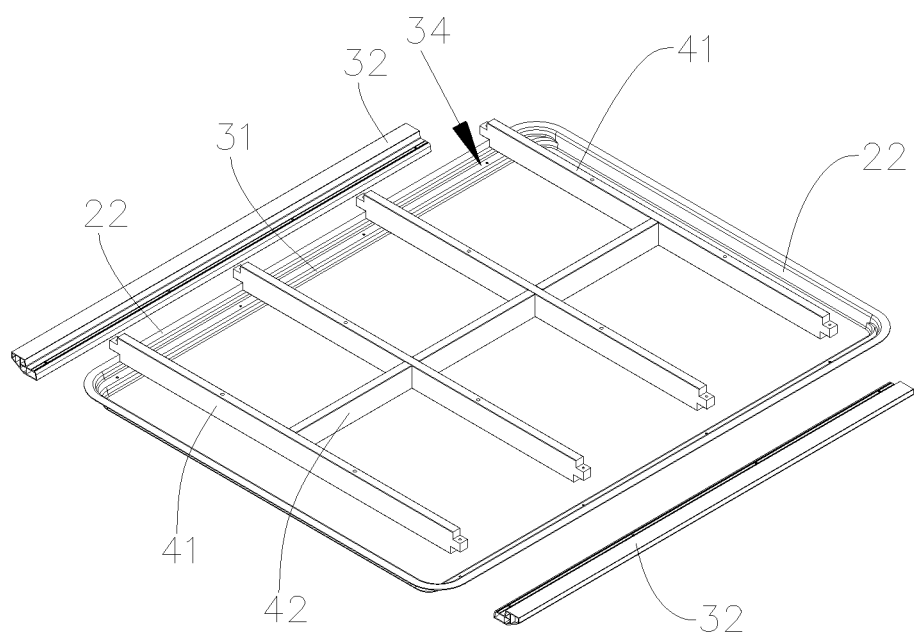
FIG. 2 is a schematic structural exploded view of FIG. 1.
Figure 3:
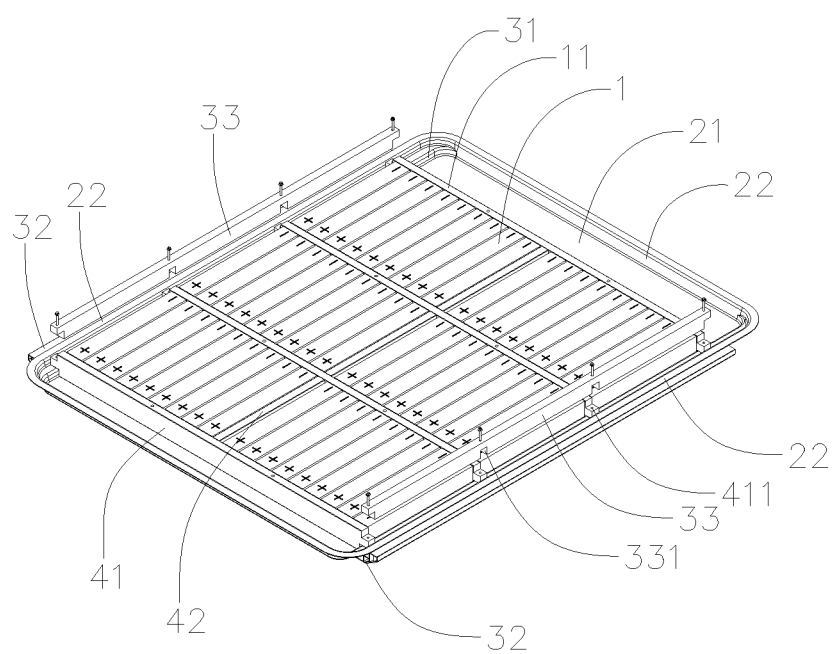
FIG. 3 is a schematic structural diagram of a battery pack having battery cells disposed therein according to an embodiment.
Figure 4:
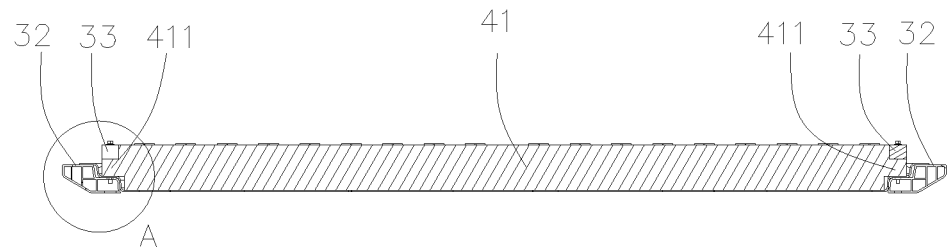
FIG. 4 is a sectional view of FIG. 3 along a direction of a cross beam.
Figure 5:
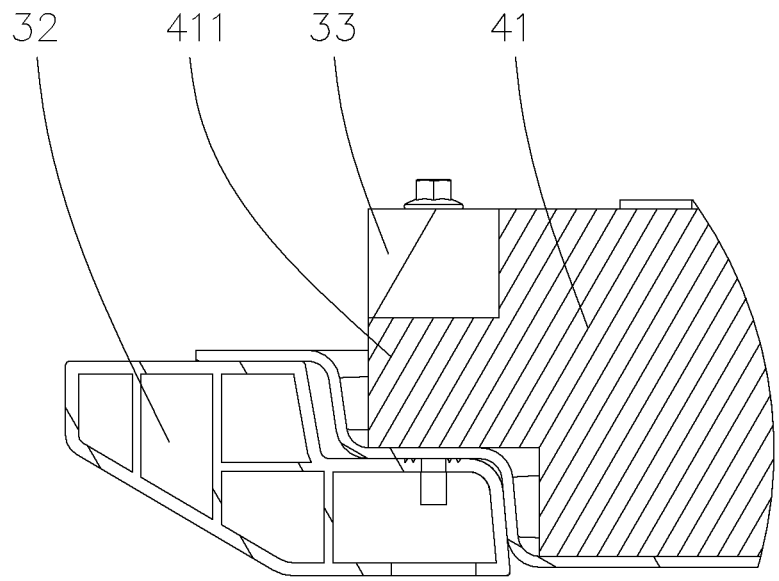
FIG. 5 is an enlarged view of a part A shown in FIG. 4.
Figure 6:
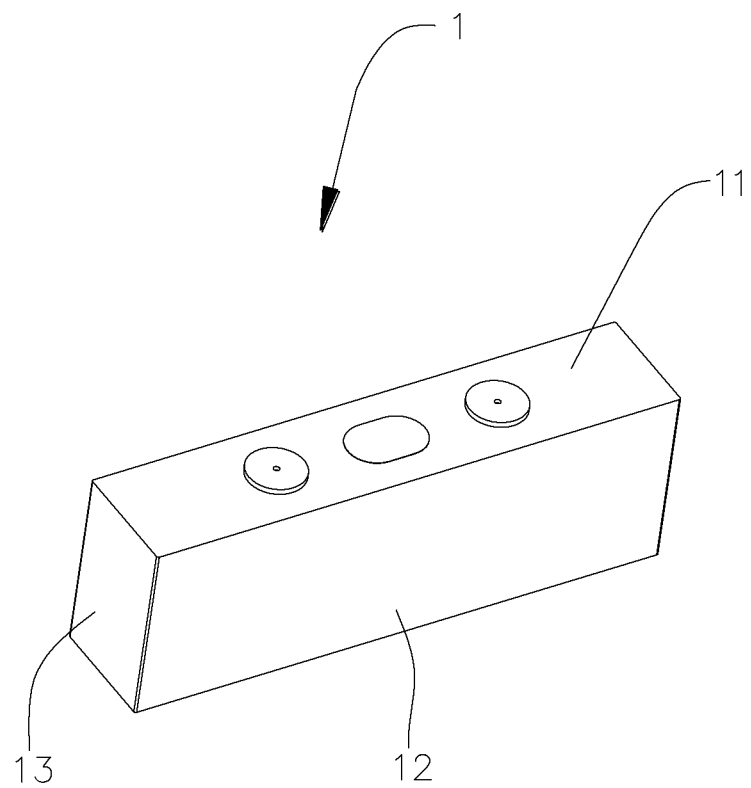
FIG. 6 is a schematic structural diagram of a battery cell.

1. Battery cell;
11. Top cover;
12. First surface;
13. Second surface;
2. Bottom plate;
22. Side plate;
31. First reinforcing beam;
32. Second reinforcing beam;
321. Adhesive overflow slot;
33. Third reinforcing beam;
331. Groove;
34. Stepped structure;
41. Cross beam;
411. Bulge;
42. Longitudinal beam.

DETAILED DESCRIPTION OF EMBODIMENTS

To describe the technical content, structural features, objectives, and effects of the technical solution in detail, the following describes the technical solution in detail with reference to specific embodiments and drawings.

In the context of this application, unless otherwise expressly specified and defined, the terms "first", "second", and "third" are for the purpose of description rather than indicating or implying any order of preference; unless otherwise expressly specified, the term "a plurality of" means two or more; and the terms such as "connect" and "fix" are to be understood in a broad sense. For example, a "connection" may be a fixed connection, or a detachable connection, or an integrated connection, or an electrical connection; and may be a direct connection or an indirect connection implemented through an intermediate medium. A person of ordinary skill in the art can understand the specific meanings of the terms in this application according to the context.

Understandably, in the context of this application, the words of direction such as "on", "above", "under", "below", "left", and "right" described in the embodiments of this application are described from a perspective shown in the drawings, and shall not be understood as a limitation on the embodiments of this application. In addition, understandably, depending on the context, one element described as being connected "on/above" or "under/below" another element not only means that the element may be directly connected "on/above" or "under/below" the other element, but also means that the element may be indirectly connected "on/above" or "under/below" the other element through an intermediate element.

Referring to FIG. 1 to FIG. 6, an embodiment of this application provides a battery pack, including: a plurality of battery cells 1 and a lower housing. The plurality of battery cells 1 are arranged in the lower housing. Each battery cell 1 includes a top cover 11 and a case. The top cover 11 is hermetically connected on a top of the case. The top cover 11 is closely connected to the case by a connecting member(s). The case includes opposite first surfaces 12 and opposite second surfaces 13. An area of each first surface 12 is larger than that of each second surface 13.

The lower housing includes a bottom plate 21 disposed at a bottom, side plates 22 respectively disposed at sides, and an opening disposed at an upper part. A pair of opposite side plates 22 of the lower housing is respectively provided with a reinforcing beam. At least one first surface 12 of the battery cells 1 is in contact with the side plate 22 of the lower housing or the reinforcing beams. The reinforcing beams serve to increase strength of the pair of opposite side plates 22 of the lower housing body. The reinforcing beams are respectively attached to the pair of opposite side plates 22 of the lower housing. A length of each reinforcing beam is the same to a length of the attached side plate 22 of the lower housing. A surface of the reinforcing beam is directly attached onto and connected to the side plate 22 of the lower housing. The battery cells 1 are arranged in rows in the lower housing. The first surfaces 12 of the battery cells 1 are attached one after another in a row. For the two outermost battery cells 1 in a row, at least one first surface 12 is in contact with the side plate 22 of the lower housing or the reinforcing beam. The side plate 22 of the lower housing or the reinforcing beam abuts against the first surface 12 of the battery cell 1, so as to prevent the first surface 12 of the battery cell 1 from bumping outward under an expansion force in the battery in a case of thermal runaway in the battery. There may be two or more rows of battery cells 1 in the lower housing. For the two outermost battery cells 1 in each row, at least one first surface 12 is in contact with the side plate 22 of the lower housing or the reinforcing beam.

In this embodiment, a cross section of the reinforcing beam is rectangular. In other embodiments, the cross section of the reinforcing beam may be triangular, circular, or other geometric shapes.

In some embodiments, the reinforcing beam includes a first reinforcing beam 31. The first reinforcing beam 31 is disposed inside the lower housing. At least one first surface 12 of the battery cells 1 is in contact with the first reinforcing beam 31. To mount the first reinforcing beam 31 more smoothly, the first reinforcing beam 31 may be directly placed at the bottom of the lower housing. The first reinforcing beam 31 has two adjacent end faces that are at a right angle, where one end face is attached with the bottom of the lower housing, and the other end face is attached with the side plate 22 of the lower housing. Alternatively, the first reinforcing beam 31 may be directly disposed on each of a pair of opposite side plates 22 of the lower housing in a suspended way. That is, one end face of the first reinforcing beam 31 is attached with the side plate 22 of the lower housing and a lower end face of the first reinforcing beam 31 is spaced apart from the bottom plate 21 of the lower housing.

In this embodiment, a height of the first reinforcing beam 31 is less than a height of the side plate 22 of the lower housing. The first reinforcing beam 31 and the side plate 22 of the lower housing are in a stepped formed. In this embodiment, the first reinforcing beam 31 is placed at the bottom of the lower housing. The first reinforcing beam has the two adjacent end faces that are at a right angle, where one end face is attached with the bottom of the lower housing, and the other end face is attached with the side plate 22 of the lower housing. A stepped structure 34 is formed by two outward end faces of the first reinforcing beam 31 and the side plate 22 of the lower housing, the side plate being exposed above the first reinforcing beam 31. In contrast to the circumstance in which the first surface 12 of the battery cell 1 is wholly attached the first reinforcing beam 31 or in which the first surface 12 of the battery cell 1 is wholly attached with the side plate 22 of the lower housing, the stepped structure 34 can be more resistant to the expansion force in the battery cell 1 and can achieve a light weight of the battery pack.

In this embodiment, the first reinforcing beam 31 and the side plate 22 of the lower housing are integrally formed. The lower housing of the battery pack is usually formed by direct casting. Thus, in an embodiment, the first reinforcing beam 31 disposed in the lower housing may be directly casted together with the lower housing. When the first reinforcing beam 31 and the side plate 22 of the lower box are in a stepped form, the side plate 22 of the lower housing may have a flat and straight outer surface, and an inner surface of the side plate 22 of the lower box forms a stepped structure together with the first reinforcing beam 31 that is casted integrally with the lower housing. In an embodiment, the side plate 22 of the lower box may be in a stepped shape in cross section, that is, the side plate 22 of the lower housing is hollowed at a lower part.

In some embodiments, the reinforcing beam includes a second reinforcing beam 32. The second reinforcing beam 32 is disposed outside the lower housing. The battery cells 1 have at least one first surface 12 in contact with the side plate 22 of the lower housing. One end face of the second reinforcing beam 32 is attached closely with an outer side of the side plate 22 of the lower housing. An extension direction of the second reinforcing beam 32 is the same to an extension direction of the side plate 22 of the lower housing.

In this embodiment, the second reinforcing beam 32 and the side plate 22 of the lower housing are integrally formed. The lower housing of the battery pack is usually formed by direct casting. Thus, in an embodiment, the second reinforcing beam 31 disposed outside the lower housing is directly casted together with the lower housing.

In some embodiments, the reinforcing beam includes a first reinforcing beam 31 and a second reinforcing beam 32. The first reinforcing beam 31 is disposed inside the lower housing. The battery cells 1 has at least one first surface 12 in contact with the first reinforcing beam 31. The second reinforcing beam 32 is disposed outside the lower housing. To mount the first reinforcing beam 31 more smoothly, the first reinforcing beam 31 may be directly placed at the bottom of the lower housing. The first reinforcing beam has two adjacent end faces that are at a right angle, where one end face is attached with the bottom of the lower housing, and the other end face is attached with the side plate 22 of the lower housing. Alternatively, the first reinforcing beam 31 may be directly disposed on each of a pair of opposite side plates 22 of the lower housing in a suspended way. That is, one end face of the first reinforcing beam 31 is attached with the side plate 22 of the lower housing, and a lower end face of the first reinforcing beam 31 is spaced apart from the bottom plate 21 of the lower housing. The second reinforcing beam 32 has one end face be attached with the outer side of the side plate 22 of the lower housing. An extension direction of the second reinforcing beam 32 is the same to an extension direction of the side plate 22 of the lower housing. In this embodiment, the first reinforcing beam 31 and the side plate 22 of the lower housing are integrally formed. The second reinforcing beam 32 and the side plate 22 of the lower housing are integrally formed.

In this embodiment, a height of the first reinforcing beam 31 is less than a height of the side plate 22 of the lower housing. The first reinforcing beam 31 and the side plate 22 of the lower housing are in a stepped formed. The second reinforcing beam 32 has a side facing the lower housing and matched with the stepped structure 34. In this embodiment, the first reinforcing beam 31 is placed at the bottom of the lower housing. The first reinforcing beam 31 has two adjacent end faces that are at a right angle, where one end face is attached with the bottom of the lower housing, and the other end face is attached with the side plate 22 of the lower housing. A stepped structure 34 is formed by two outward end faces of the first reinforcing beam 31 and the side plate 22 of the lower housing, the side plate being exposed above the first reinforcing beam 31. In contrast to the circumstance in which the first surface 12 of the battery cell 1 is wholly attached with the first reinforcing beam 31 or in which the first surface 12 of the battery cell 1 is wholly attached with the side plate 22 of the lower housing, the stepped structure 34 can be more resistant to the expansion force in the battery cell 1. The cross section of the side plate 22 of the lower housing is in a stepped shape, that is, the side plate 22 of the lower housing body is hollowed at the lower part. The second reinforcing beam 32 is attached with the stepped structure 34 of the lower housing. This ensures flatness and straightness of the outer surface of the side plate 22 of the lower housing, effectively increases the strength of the side plate 22 of the lower housing, effectively resists the expansion force of the battery cell 1 due to thermal runaway, and achieves a light weight of the battery pack.

Figure 7:
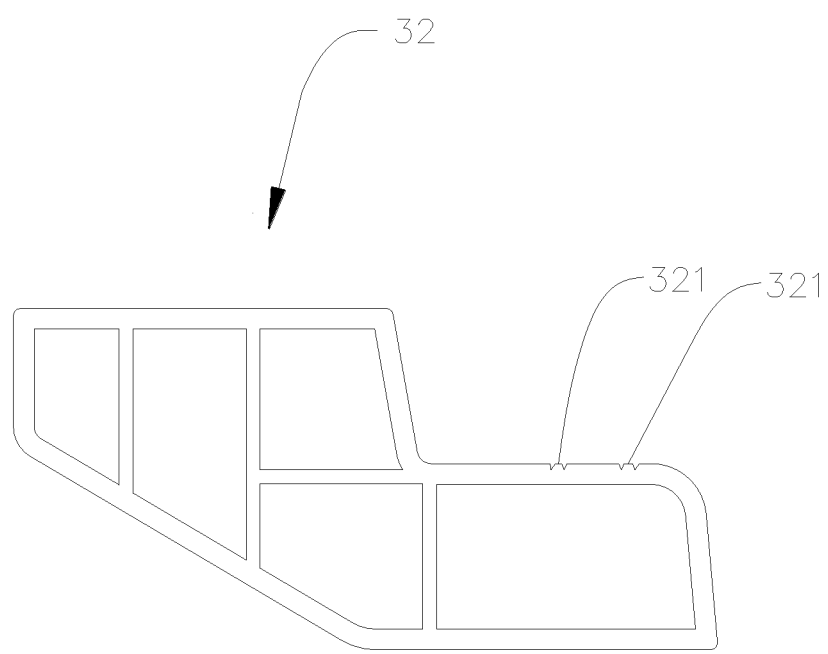
FIG. 7 is a schematic sectional view of a second reinforcing beam.

As shown in FIG. 7, in this embodiment, an adhesive layer is disposed on an upper surface of the second reinforcing beam 32, the upper surface facing the stepped structure 34 of the lower housing. An upper surface of the adhesive layer is adhered to a lower surface of the stepped structure 34 of the lower housing. A lower surface of the adhesive layer is adhered to the upper surface of the second reinforcing beam 32, the upper surface facing the stepped structure 34 of the lower housing. The adhesive layer effectively adheres the second reinforcing beam 32 to the outer side of the lower housing. In a process of applying the adhesive layer, to prevent adhesive from flowing on the upper surface of the second reinforcing beam 32 (the upper surface facing the stepped structure 34 of the lower housing), an adhesive overflow slot 321 is disposed on the upper surface of the second reinforcing beam 32, the upper surface being facing the stepped structure 34 of the lower housing. The adhesive overflow slot 321 is a slot structure provided along a length direction of the second reinforcing beam 32. There may be two or more adhesive overflow slots 321. The two or more adhesive overflow slots are parallel.

In some embodiments, the battery pack further includes a cross beam(s) 41. The cross beam 41 is perpendicular to the reinforcing beam. Both ends of the cross beam 41 are respectively fixedly connected to the side plates 22 of the lower housing or the reinforcing beam. The cross beam(s) 41 divides an internal space of the lower housing into at least two battery regions. The rows of the battery cells 1 are separated by the cross beam(s) 41. The cross beam 41 connected to the side plate 22 of the lower housing or the reinforcing beam also serves to increase the strength of the lower housing, thereby being more resistant to the expansion force of the first surface 12 due to thermal runaway of the battery cell 1.

In this embodiment, the both ends of the cross beam 41 are respectively connected to the side plates 22 of the lower housing or the reinforcing beam by a connecting member. In other embodiments, the both ends of the cross beam 41 may be respectively connected to the side plate 22 of the lower housing or the reinforcing beam by adhesive or a snap-fit structure. This achieves a benefit that the strength of connection between the cross beam 41 and the side plate 22 of the lower housing or the reinforcing beam is increased.

In this embodiment, the battery pack further includes a longitudinal beam(s) 42. The longitudinal beam 42 is perpendicular to the cross beam 41. A notch structure is provided at the longitudinal beam 42 or the cross beam 41. The longitudinal beam 42 is connected to the cross beam 41 by the notch structure. The cross beam(s) 41 and the longitudinal beam(s) 42 jointly divide the inner space of the lower housing into at least two battery regions. The longitudinal beam 42 may further divide each battery region that is formed by two adjacent cross beams 41, into at least two battery regions, so as to form more battery regions. Understandably, the number of the longitudinal beams 42 may be less than the number of the cross beams 41 by one. After the cross beams 41 are arranged in parallel, the longitudinal beams 42 are arranged across adjacent cross beams 41 and are connected to the cross beams 41 by a connecting structure.

In this embodiment, the reinforcing beam further includes a third reinforcing beam 33. The third reinforcing beam 33 is disposed inside the lower housing and located on the cross beam 41. The third reinforcing beam 33 is perpendicular to the cross beam 41. A bulge 411 is provided at each of two ends of the cross beam 41. The third reinforcing beam 33 is provided with a groove 331 at a position corresponding to each bulge 411 of the cross beam 41. The bulge 411 at each end of the cross beam 41 is snap-fitted into the groove 331 of the third reinforcing beam 33. The third reinforcing beam(s) 33, the cross beam(s) 41, and the first reinforcing beam(s) 31 or the second reinforcing beam(s) 32 are respectively connected by a connecting member. The connecting member is connected to a position on the bulge 411, the position being corresponding to the groove 331. In the case that the first reinforcing beam 31 is disposed in the battery pack, the third reinforcing beam 33 serves to increase a contact area between the reinforcing beam and the battery cell 1, thereby being more resistant to the expansion of the battery cell 1. In the case that the second reinforcing beam 32 is disposed for the battery pack, the third reinforcing beam 33 serves to directly abut against the first surface 12 of the battery cell 1, thereby being more resistant to the expansion of the battery cell 1.

In this embodiment, the groove 331 is provided on the first reinforcing beam 31. The bulge 411 at each of two ends of the cross beam 41 is snap-fitted into the groove 331 of the first reinforcing beam 31. In this way, the connection structure between the cross beam 41 and the first reinforcing beam 31 is firmer and is more resistant to the expansion of the battery cell 1.

It needs to be noted that although the foregoing embodiments have been described herein, the patent protection scope of the present invention is not limited to the embodiments. Therefore, any changes and modifications made to the embodiments hereof based on the innovative concept of the present invention, any equivalent structural alterations or equivalent process alterations made by using the content of the specification and drawings of the present invention, and any direct or indirect application of the foregoing technical solutions to another related technical field, fall within the patent protection scope of the present invention.

What is claimed is:

1. A battery pack, comprising:
   a plurality of battery cells, wherein each of the plurality of battery cells comprises a top cover and a case, the top cover is hermetically connected on a top of the case, the case comprises opposite first surfaces and opposite second surfaces, and an area of each first surface is larger than that of each second surface;
   a lower housing, comprising a bottom plate disposed at a bottom, side plates disposed at sides, an opening disposed at an upper part;
   a reinforcing beam disposed on and connected to each one of the side plates of the lower housing and extending in the same direction as the side plate connected thereto, wherein a surface of each reinforcing beam is directly attached onto the side plate along the extending direction; and
   at least one cross beam disposed in the lower housing and perpendicular to the reinforcing beam;
   wherein the reinforcing beam comprises:
   a first reinforcing beam disposed inside the lower housing, an end face of the first reinforcing bean is attached with the bottom of the lower housing, and at least one first surface of the plurality of battery cells is in contact with at least one of a side plate of the lower housing and the first reinforcing beam;
   a second reinforcing beam disposed outside the lower housing and attached to an outer surface of the side plate; and
   a third reinforcing beam disposed inside the lower housing, located above and perpendicular to the at least one cross beam, attached to an inner surface of the side plate, and abut against the first surfaces of the battery cell.

2. The battery pack according to claim 1, wherein a height of the first reinforcing beam is less than a height of the side plate of the lower housing, and the first reinforcing beam and the side plate of the lower housing are formed in a stepped shape.

3. The battery pack according to claim 1, wherein the first reinforcing beam and the side plate of the lower housing are integrally formed.

4. The battery pack according to claim 1, wherein the second reinforcing beam and the side plate of the lower housing are integrally formed.

5. The battery pack according to claim 1, wherein a height of the first reinforcing beam is less than a height of the side plate of the lower housing, the first reinforcing beam and the side plate of the lower housing are formed into a stepped structure, and a side of the second reinforcing beam facing the lower housing, is a structure that matches with the stepped structure.

6. The battery pack according to claim 1, wherein an adhesive layer is disposed on an upper surface of the second reinforcing beam, the upper surface facing the stepped structure of the lower housing.

7. The battery pack according to claim 6, wherein an adhesive overflow slot is disposed on the upper surface of the second reinforcing beam, the upper surface facing the stepped structure of the lower housing.

8. The battery pack according to claim 1, wherein the first reinforcing beam and the side plate of the lower housing are integrally formed casted.

9. The battery pack according to claim 1, wherein the second reinforcing beam and the side plate of the lower housing are integrally casted.

10. The battery pack according to claim 1, wherein the at least one cross beam is fixedly connected to the side plates of the lower housing or the reinforcing beam at both ends of the at least one cross beam, and the at least one cross beam is configured to divide an internal space of the lower housing into at least two battery regions.

11. The battery pack according to claim 10, wherein the at least one cross beam is connected to the side plate of the lower housing or the reinforcing beam at each end of the at least one cross beam by a connecting member.

12. The battery pack according to claim 10, further comprising at least one longitudinal beam, wherein the at least one longitudinal beam is perpendicular to the at least one cross beam, a notch structure is provided at the at least one longitudinal beam or the at least one cross beam, the at least one longitudinal beam is connected to the at least one cross beam by the notch structure, and the at least one cross beam and the at least one longitudinal beam are configured to jointly divide the inner space of the lower housing into at least two battery regions.

13. The battery pack according to claim 10, wherein a bulge is disposed at each of two ends of the at least one cross beam, a groove is provided at a position on the third reinforcing beam, the position corresponding to the bulge of the at least one cross beam, and the bulge at each end of the cross beam is snap-fitted into the groove of the third reinforcing beam.

* * * * *